United States Patent [19]

Zahner, deceased

[11] 4,375,527

[45] Mar. 1, 1983

[54] FIBERGLASS REINFORCED PLASTIC INSULATING MEMBER SUBMITTED TO MECHANICAL EFFORTS WITHIN A HIGH-VOLTAGE SWITCHING ENCLOSURE CONTAINING SULPHUR-HEXAFLUORIDE GAS

[75] Inventor: Hansruedi Zahner, deceased, late of Oberentfelden, Switzerland, by Martin H. Hochstrasser, administrator

[73] Assignee: Sprecher & Schuh AG, Aarau, Switzerland

[21] Appl. No.: 202,422

[22] Filed: Oct. 30, 1980

[30] Foreign Application Priority Data

Nov. 5, 1979 [CH] Switzerland ........................ 9903/79

[51] Int. Cl.³ ................................................ C08K 3/40

[52] U.S. Cl. .................................... 524/492; 428/285; 428/417; 428/430; 428/426; 174/DIG. 1; 501/35; 501/70

[58] Field of Search ............... 428/285, 430, 426, 417; 106/50; 174/DIG. 1; 524/494, 492; 501/35, 70

[56] References Cited

U.S. PATENT DOCUMENTS

| | | | |
|---|---|---|---|
| 3,467,760 | 9/1969 | Hugi | 174/DIG. 1 |
| 3,574,104 | 4/1971 | Medler | 428/285 |
| 3,945,838 | 3/1976 | Erickson | 106/50 |
| 4,046,948 | 9/1977 | Zlochower | 106/50 |
| 4,199,364 | 4/1980 | Neely | 106/50 |
| 4,251,590 | 2/1981 | Rubright | 428/285 |
| 4,263,364 | 4/1981 | Seymour | 428/285 |

FOREIGN PATENT DOCUMENTS

| | | | |
|---|---|---|---|
| 2745965 | 7/1978 | Fed. Rep. of Germany | 174/DIG. 1 |
| 1435073 | 3/1966 | France | 501/35 |

*Primary Examiner*—Ellis P. Robinson

*Attorney, Agent, or Firm*—Ladas & Parry

[57] ABSTRACT

The resistance of insulating pieces made of fiberglass reinforced plastics against the decay products of $SF_6$, such as occur within sealed high-voltage switching devices is unexpectedly enhanced by the use of a reinforcing fiberglass made of a low-alkali silicate glass containing neither boron nor boron-compounds.

1 Claim, 1 Drawing Figure

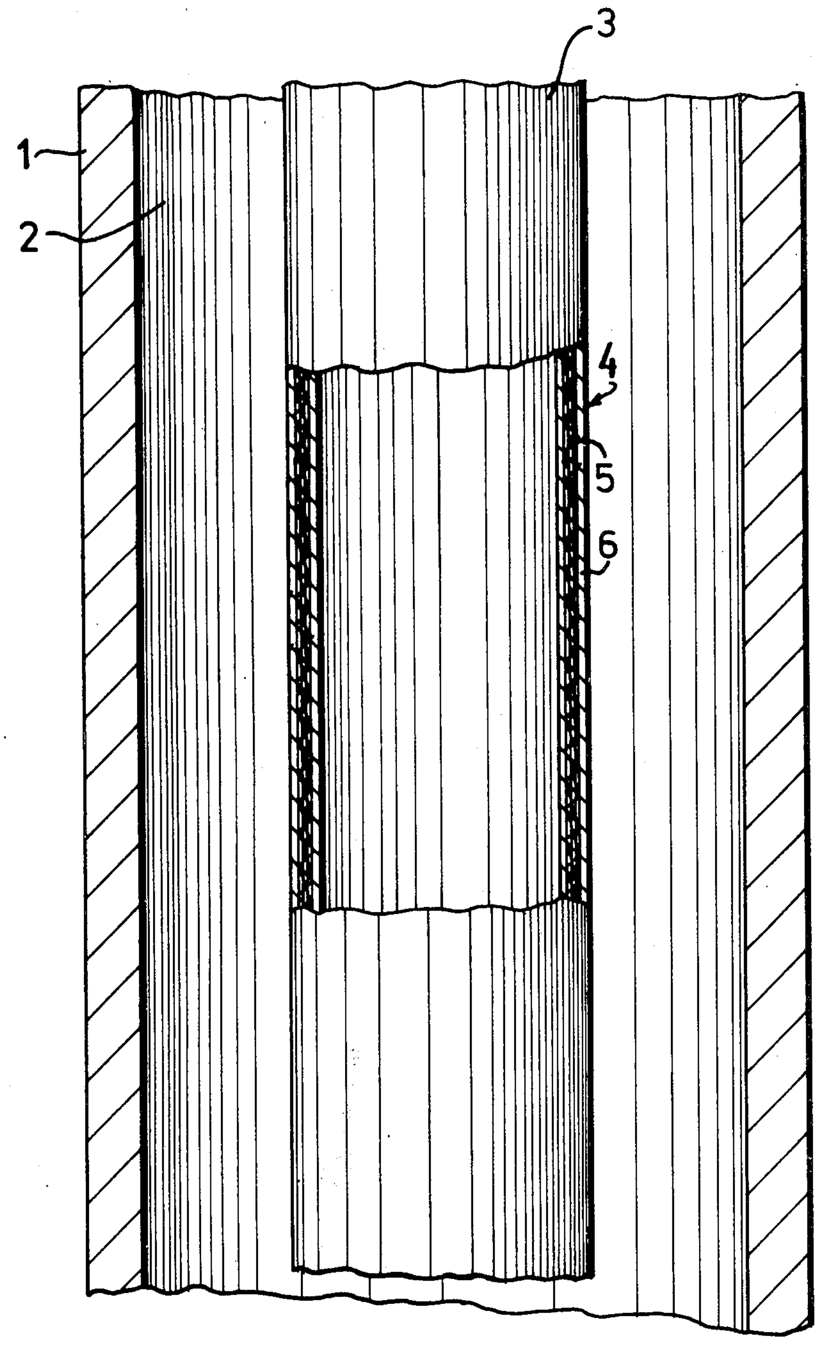
1
2
3
4
5
6

FIBERGLASS REINFORCED PLASTIC INSULATING MEMBER SUBMITTED TO MECHANICAL EFFORTS WITHIN A HIGH-VOLTAGE SWITCHING ENCLOSURE CONTAINING SULPHUR-HEXAFLUORIDE GAS

FIELD OF THE INVENTION

The invention pertains to an insulating member made of fiberglass reinforced plastic, such as a switch-actuating rod, intended to transmit mechanical forces within a high-voltage switching enclosure containing sulphur-hexafluoride gas, and wherein electrical discharges and/or arcing occur at least temporarily. Such members must be able to transmit huge forces and also jolt-like efforts during sizeable time intervals without suffering breakage or other damage.

DESCRIPTION OF THE PRIOR ART

Because of the electric resistivity and mechanical strength of fiberglass reinforced plastic, it is usual to make said members out of this material, which is indeed satisfactory when new.

It is known, however, that materials containing silicone or boron-like porcelain, plastic pieces containing quartz sand, and fiberglass-reinforced synthetic materials—will be modified by the decay products of $SF_6$ in a way which even after a short time may reduce their electrical resistance to unacceptably low values.

Therefore the Swiss Pat. No. 466 391 suggests to renounce the use of any silicon- or boron-compounds within the insulating pieces, in order to avoid said much feared reduction of the electrical resistance.

Now pieces submitted to intense mechanical efforts, like switch-actuating rods, require the use of fiber materials which have a high strength and elasticity, but a low elastic elongation. If one were to avoid glass fibers altogether, because they contain silicon and boron, then one would have to resort to materials unsuitable because of their high costs.

For these reasons, the German patent application published under No. 24 29 475 proposes to protect the fiberglass-reinforced plastic material of an actuating rod by a protective layer made of plastic and organic fibers, such as polyester fibers for instance. It turned out, however, that the much feared decay products of sulphur-hexafluoride diffuse through such layers and still attack the glass fibers.

Furthermore, the insulating pieces made of glass-reinforced plastic suffer such loss of strength by the action of said decay products, that they become unable to fulfill the strengthening function for which they are intended.

SUMMARY OF THE INVENTION

The invention aims at providing insulating members submitted to mechanical efforts within a high-voltage switching device containing sulphur-hexafluoride gas, and in which electrical discharges and/or acting occur at least temporarily, where these members have a high mechanical strength, are sufficiently resistant against the decay products of $SF_6$ and can be produced economically.

In order to achieve these aims, the invention proposes an insulating member, characterized in that it comprises a fiberglass reinforcement made of a low alkali glass which contains neither boron nor boron-compounds.

This turns out to be very satisfactory, because, in contradiction with the teachings of the Swiss Patent 466 391, it was found that in the absence of boron and its compounds a low alkali silicate glass in particular a commercial grade R-glass is well suited as reinforcing material, and that its use avoids the fearsome reduction of the electrical resistance and mechanical strength induced by the action of the decay products of $SF_6$. Although a certain diminution of said features still may occur, it will, for the insulating members of the invention, remain within such limits, that their serviceability is not impaired.

Glass fibers made of a glass which contains, by weight, 50–65% $SiO_2$, 20–30% $Al_2O_3$, 5–20% MgO and 2–10% CaO, where the sum of the weight percentages of CaO and MgO lies in the range 15–25%, the ratio of the weight percentage of $SiO_2$ to that of $Al_2O_3$ is at least 2 and at the most 2.5, and the ratio of the weight percentage of MgO to that of $SiO_2$ does not exceed 0.3, have proved particularly adequate. Such fibers are cheap and available commercially.

The plastic material for making insulating members according to the invention may be known plasticlike epoxy resins, polyester resins, silicone resins, polyurethane resins, phenolic resins or melamine resins. Of course, in order to realize insulating members according to the invention, one will preferably use resin mixtures with a comparatively low viscosity and a pot life long enough to allow for a thorough mixing and a good shaping. In this respect, it is advantageous to use known cycloaliphatic epoxy resins, together with adequate hardening agents.

It can be advantageous to include sizing-less glass fibers in the insulating members according to the invention. Such fibers can for example be obtained by a thermal treatment of fibers which have a sizing. It must be noted in this context, that the initial strength of the insulating members may be lower when using sizing-less fibers than when one uses the same fibers, but with a sizing applied. This may be due to the breakage of fibers, and to the ensuing shorter fiber length.

The invention will now be illustrated by way of example, and with reference to the purely schematic drawing.

BRIEF DESCRIPTION OF THE DRAWING

The FIGURE represents a partially broken away lengthwise section through a part of an enclosing pipe 1, the interior 2 of which is filled with $SF_6$ gas, and through which runs a pipe-shaped, hollow switch-actuating rod 3. Where the latter is partially broken away, it can be seen that its laminated wall 4 consists of a plastic matrix 6 and a fiberglass reinforcement 5.

DETAILED DESCRIPTION OF PREFERRED EMBODIMENTS

A fabrication method for three rods, of which two are embodiments of the invention, will now be described by way of example and for comparison purposes.

In this example, rods I and II comprised a glass reinforcement made from commercial grade, low alkali R-glass fibers free of boron and boron compounds. The fibers of rod I had a sizing, those of rod II did not.

For comparison, the rod III is reinforced with a commercial grade E-glass, which contains boron and has a normal alkali content.

The matrix was prepared from a mixture containing 100 parts by weight of cycloaliphatic epoxy resin and 80 parts by weight of hexahydrophtalic acid anhydride.

The laminating process comprised a breathing at 100° C. in a vacuum, followed by jelling under pressure, and curing at atmospheric pressure, at 140° C.

Samples were taken from all three rods and exposed during several hundred hours to electric discharges in an environment of $SF_6$ gas.

Examination of the samples yielded the following results:

The rods I and II (made according to the invention) had a satisfactory aspect. They were mechanically and electrically serviceable for normal use. Rod II exhibited a smaller initial strength, but also a smaller loss of strength during exposure.

Rod II, with a reinforcement made of E-glass fibers, already looked decayed and was utterly unfit for use.

This shows clearly that, in contradiction to expectations, a low alkali silicate-glass which contains neither boron nor boron-coupounds is suitable as a reinforcement of the kind described above, for said switch-actuating rods. From which it follows, that the decay which should take place according to former teachings is much less severe than expected. Quantitatively, it must be noted that switching-rods of the invention were still serviceable when the usual fiberglass reinforced plastic materials already had become completely useless.

What is claimed is:

1. A fiberglass-reinforced plastic electric-insulating member which is subject to mechanical forces and in contact with decomposition products of $SF_6$ gas which comprises a fiberglass reinforcement made of a low alkali glass containing neither boron nor boron-containing compounds, said glass having the following composition in percentages by weight:

50–65% $SiO_2$
20–30% $Al_2O_2$
5–20% MgO
2–10% CaO the sum of the weight percentages of CaO and MgO lying in the range of 15 to 25%, the ratio of the weight percentage of $SiO_2$ to that of $Al_2O_3$ being at least 2 and at the most 2.5, and the ratio of the weight percentage of MgO to that of $SiO_2$ not exceeding 0.3.

* * * * *